(12) United States Patent
Feng et al.

(10) Patent No.: US 11,898,083 B2
(45) Date of Patent: Feb. 13, 2024

(54) AZOBENZENE-GRAPHENE METAL COORDINATION SOLAR PHOTOTHERMAL ENERGY STORAGE MATERIAL AND PREPARATION THEREOF

(71) Applicant: TIANJIN UNIVERSITY, Tianjin (CN)

(72) Inventors: Yiyu Feng, Tianjin (CN); Hui Wang, Tianjin (CN); Wei Feng, Tianjin (CN); Huitao Yu, Tianjin (CN)

(73) Assignee: TIANJIN UNIVERSITY

( * ) Notice: Subject to any disclaimer, the term of this patent is extended or adjusted under 35 U.S.C. 154(b) by 526 days.

(21) Appl. No.: 17/191,863

(22) Filed: Mar. 4, 2021

(65) Prior Publication Data
US 2022/0010188 A1  Jan. 13, 2022

(30) Foreign Application Priority Data
Jul. 7, 2020 (CN) .......................... 202010647274.5

(51) Int. Cl.
| | | |
|---|---|---|
| *C09K 5/14* | (2006.01) | |
| *C07F 3/00* | (2006.01) | |
| *C07F 15/04* | (2006.01) | |
| *C07F 15/02* | (2006.01) | |
| *C07F 3/02* | (2006.01) | |
| *F28D 20/00* | (2006.01) | |
| *C09K 5/16* | (2006.01) | |
| *F24S 80/00* | (2018.01) | |
| *F24S 60/20* | (2018.01) | |

(52) U.S. Cl.
CPC ................ *C09K 5/14* (2013.01); *C07F 3/003* (2013.01); *C07F 3/02* (2013.01); *C07F 15/025* (2013.01); *C07F 15/045* (2013.01); *C09K 5/16* (2013.01); *F28D 20/003* (2013.01); *F24S 60/20* (2018.05); *F24S 2080/014* (2018.05)

(58) Field of Classification Search
CPC .......... C07F 3/003; C07F 3/02; C07F 15/025; C07F 15/045; C09K 5/16; F28D 20/003; F24S 2080/014; F24S 60/20
See application file for complete search history.

(56) References Cited

U.S. PATENT DOCUMENTS

| | | | |
|---|---|---|---|
| 10,160,720 B1* | 12/2018 | Feng ..................... | C07C 245/08 |
| 2018/0355234 A1* | 12/2018 | Grossman ............... | F24S 60/00 |

FOREIGN PATENT DOCUMENTS

| | | | | |
|---|---|---|---|---|
| CN | 101870467 A | * | 10/2010 | |
| CN | 104045754 A | * | 9/2014 | |
| CN | 105218411 A | * | 1/2016 | |
| CN | 105295045 A | * | 2/2016 | |
| CN | 105542584 A | * | 5/2016 | |
| CN | 105969321 A | * | 9/2016 | ........... C07C 245/08 |
| CN | 106047307 A | * | 10/2016 | ........... C07C 303/22 |
| CN | 106966929 A | * | 7/2017 | ........... C07C 269/04 |
| CN | 107488135 A | * | 12/2017 | ........... C07C 303/22 |

OTHER PUBLICATIONS

Dong; Chem. Soc. Rev. 2018, 47, 7339-7368. https://doi.org/10.1039/C8CS00470F (Year: 2018).*
Feng; J. Mater. Chem. A, 2016, 4, 8020-8028. https://doi.org/10.1039/C6TA00221H (Year: 2016).*
Feng; Sci Rep 2013, 3, 3260. https://doi.org/10.1038/srep03260 (Year: 2013).*
Hummers; J. Am. Chem. Soc. 1958, 80, 6, 1339. https://doi.org/10.1021/ja01539a017 (Year: 1958).*
Luo; J. Mater. Chem. A, 2015, 3, 11787-11795. https://doi.org/10.1039/C5TA01263E (Year: 2015).*
Luo; Nanoscale, 2015,7, 16214-16221. https://doi.org/10.1039/C5NR03558A (Year: 2015).*
Wang; Nano Energy 2021, 89, 106401. https://doi.org/10.1016/j.nanoen.2021.106401 (Year: 2021).*
Yan; Energy Storage Materials 2020, 24, 662-669. https://doi.org/10.1016/j.ensm.2019.06.005 (Year: 2020).*
Yu; Carbon 2013, 54, 310-322. https://doi.org/10.1016/j.carbon.2012.11.043 (Year: 2013).*
Zhao; ChemSusChem 2017, 10, 1395-1404. https://doi.org/10.1002/cssc.201601551 (Year: 2017).*
Allen; Chem. Rev. 2010, 110, 1, 132-145. https://doi.org/10.1021/cr900070d (Year: 2010).*

* cited by examiner

*Primary Examiner* — Daniel R Carcanague
(74) *Attorney, Agent, or Firm* — The Belles Group, P.C.

(57) ABSTRACT

The present disclosure relates to an azobenzene-graphene metal coordination solar photothermal energy storage material based on metal coordination bonds and a preparation method thereof. The method comprises the following steps: preparing reduced graphene oxide; preparing an azobenzene-graphene material; and preparing an azobenzene-graphene metal coordination solar photothermal energy storage material: dispersing the prepared azobenzene-graphene material in DMF, dissolving a certain amount of metal compound in DMF, adding the DMF solution of the metal compound into the DMF solution of the azobenzene-graphene, taking out the precipitate, washing off metal ions which do not participate in coordination, and drying the obtained product to obtain the azobenzene-graphene metal coordination solar photothermal energy storage material. The present disclosure also relates to a method for improving the solar photothermal energy storage ability of a molecular solar energy fuel, comprising using an azobenzene-graphene metal coordination solar photothermal energy storage material.

6 Claims, 4 Drawing Sheets

AZOBENZENE-GRAPHENE METAL COORDINATION SOLAR PHOTOTHERMAL ENERGY STORAGE MATERIAL AND PREPARATION THEREOF

CROSS REFERENCE TO RELATED APPLICATIONS

The application claims the priority to Chinese Patent Application No. 202010647274.5, titled "AZO-GRAPHENE COMPOSITE HEAT STORAGE MATERIAL BASED ON METAL COORDINATION BOND AND PREPARATION THEREOF", filed on Jul. 7, 2020 with the China National Intellectual Property Administration, which is incorporated herein by reference in entirety.

FIELD OF THE INVENTION

The present disclosure belongs to the field of solar photothermal energy storage, and relates to azobenzene-graphene metal coordination solar photothermal energy storage material and preparation method thereof, which have important application prospects in the aspects of absorption, conversion and storage of solar energy.

BACKGROUND

With the rapid development of global economies, science and technology, global energy consumption and demand are increasing. However, non-renewable fossil energy such as oil, coal, natural gas is increasingly depleted. When fossil energy is consumed in large quantities, a huge amount of gas ($H_2S$, $CO_2$, $SO_2$, $NO_x$, etc.) is released, causing serious environmental pollution and climate problems such as and global warming. Such energy crisis and environmental pollution have become two serious problems that restrict the sustainable development of human society. The development of environmental protection and renewable new energy has become an inevitable choice for the future development of mankind. The development of new energy is of great significance to improving the ecological environment and improving China's energy and economic security.

New energy sources, also called as unconventional energy resources, are a variety of energy forms that are different from the traditional energy. They mainly include geo-thermal energy, ocean energy, solar energy, wind energy, biomass energy and so on, in which the solar energy stands out among new energy sources due to its advantages such as its abundant reserves, strong availability, inexhaustible, and environmental friendliness. In early time, people used solar energy mainly to convert light to heat, such as drilling wood to get fire, drying clothes or food, and solar water heaters. However, since it cannot be stored, it can only be used immediately, which limits its application in controlled heat storage. In recent years, molecular solar energy storage systems have attracted widespread attention from researchers. They store light energy in the form of chemical energy and then releases it in the form of heat energy to achieve the storage and utilization of light and thermal energy, thereby achieving the purpose of a controllable thermal management system.

Solar photothermal energy storage molecules mainly include azobenzene, norbornadiene, spiropyran and so on, in which azobenzene is one of the most widely studied light-responsive materials. Its heat storage mechanism is: azobenzene molecules transfer from a stable trans-configuration to a metastable cis-configuration under ultraviolet light, then the cis-configuration may restore to the trans-configuration under a condition of light or heat. There is a difference in energy between such two configurations. Isomerization from trans to cis stores solar energy, and from cis to trans releases heat. Researchers use molecular structure design, such as methods of compounding with phase change materials and grafting with carbon materials to increase the heat storage density and extend the heat storage time (half-life). By introducing coordination bonds, the energy level difference and the thermal recovery barrier between the cis and trans isomers of fuel molecules can be increased, and the heat storage density can be further greatly improved. Optically triggered formation and dissociation of coordination bonds in solid-state not only enlarges molecular energy gap by lowering energy level of trans-isomer but also accelerates the reversion by increasing energy level of cis-isomer.

BRIEF SUMMARY

The technical problem to be solved by the present invention is to provide a molecular solar photothermal energy storage fuel with high heat storage density and its preparation method. The technical solutions are as follows:

Provided is an azobenzene-graphene metal coordination solar photothermal energy storage material represented by the following chemical structural formula:

wherein M=Mg, Ni, Zn, Cu or Ca; and
X=Fe or Al.

It can be seen from the chemical structural formula that azobenzene compounds are grafted onto a monolayer graphene, and the azobenzene-graphene material are connected through metal coordination bonds. The excellent heat storage effect of the azobenzene-graphene metal coordination solar photothermal energy storage material is achieved by improving the energy level difference and the heat recovery barrier between the cis and trans isomers of the fuel molecules through coordination bonds. The scheme of isomerization from trans isomers to cis isomers of the azobenzene-graphene metal coordination solar photothermal energy storage material (in which the coordination central ion is a magnesium ion as an example) is as follows:

Trans isomers      Cis isomers

The present disclosure also provides a method for preparing the azobenzene-graphene metal coordination solar photothermal energy storage material, comprising the following steps:

(1) preparing reduced graphene oxide: hydrothermally reacting an aqueous solution of graphene oxide (GO) prepared by Hummers method to obtain an aqueous solution of reduced graphene oxide (RGO);

(2) preparing an azobenzene-graphene material: preparing a hydrochloric acid solution of 4'-aminoazobenzene-4-sulphonic acid and a hydrochloric acid solution of $NaNO_2$ respectively, adding the hydrochloric acid solution of $NaNO_2$ dropwise into the hydrochloric acid solution of 4'-aminoazobenzene-4-sulphonic acid at 0-5° C. to form a diazonium salt; adding the diazonium salt into the aqueous solution of the reduced graphene oxide obtained in step (1) to react for a period of time; and washing the obtained product with water, N,N-dimethylformamide (DMF) and ethanol until no characteristic absorption peak of azo appears in the UV absorption detection of the filtrate; and drying to obtain an azobenzene-graphene material;

(3) preparing an azobenzene-graphene metal coordination solar photothermal energy storage material: dispersing the azobenzene-graphene material prepared in step (2) in DMF and dissolving a certain amount of a metal compound in DMF, adding the DMF solution of the metal compound into the DMF solution of the azobenzene-graphene, taking out the precipitate, washing off metal ions which do not participate in coordination, and drying the obtained product to obtain an azobenzene-graphene metal coordination solar photothermal energy storage material.

In step (1), the aqueous solution of graphene oxide (GO) is hydrothermally reacted at 60° C.-160° C. for 2-48 h.

A coordinating group on the phenyl ring or pyridyl ring opposite to the amino group in the azo compound is a sulphonic acid group, a phosphoric acid group, carboxyl, hydroxyl, amino, nitro, a carbonic acid group, an ester group or an amide group.

The metal compound used for coordination is $MgCl_2$, $NiCl_2$, $ZnCl_2$, $CuCl_2$, $CaCl_2$), $FeCl_3$, or $AlCl_3$; that is, the coordination central ion in the azobenzene-graphene metal coordination solar photothermal energy storage material is a magnesium ion, a nickel ion, a zinc ion, a copper ion, a calcium ion, an iron ion, or an aluminum ion.

The molar ratio of the metal compound used for coordination to azobenzene-graphene is (0.1-20):1.

The azobenzene-graphene metal coordination solar photothermal energy storage material obtained in accordance with the present disclosure comprises coordination bonds and hydrogen bonds, wherein the coordination bonds and the hydrogen bonds can increase the energy level difference and thermal recovery barrier between the cis and trans isomers of the fuel molecules, thereby enhancing the heat storage ability of the molecular solar energy fuel.

The azobenzene-graphene metal coordination solar photothermal energy storage material can realize isomerization from trans to cis under the irradiation of light at the wavelength of 280-400 nm and release heat under the irradiation of light at the wavelength of 420-520 nm. It has a heat storage density of up to 400-750 J/g according to (DSC) detection.

The present disclosure also provides a method for improving the solar photothermal energy storage ability of a molecular solar energy fuel, comprising using the above azobenzene-graphene metal coordination solar photothermal energy storage material.

DETAILED DESCRIPTION

The following description is given to further explain the present disclosure, rather than limit the scope thereof.

The method for preparing the azobenzene-graphene metal coordination solar photothermal energy storage material will be described in detail based on its particular structure, comprising:

(1) preparing a reduced graphene oxide: adjusting the concentration of the aqueous solution of the graphene oxide (GO) prepared by Hummers method to 0.01-10 mg/mL, and hydrothermally reacting the aqueous solution at 60° C.-160° C. for 2-48 hours to obtain an aqueous solution of reduced oxidation graphene (RGO);

(2) preparing an azobenzene-graphene material: dissolving aminoazobenzene with coordinating groups and $NaNO_2$ into 1 mol/L HCl aqueous solution at room temperature, respectively, adding the hydrochloric acid solution of $NaNO_2$ dropwise into the hydrochloric acid solution of 4'-aminoazobenzene-4-sulphonic acid at 0-5° C. to form a diazonium salt; adding the diazonium salt into the aqueous solution of the reduced graphene oxide obtained in step (1) to react for 2-24 h; washing the obtained product with water, N,N-dimethylformamide (DMF) and ethanol until no characteristic absorption peak of azo appears in the UV absorption detection of the filtrate; and then drying the obtained product in an oven at 60° C., to obtain the azobenzene-graphene material;

(3) preparing an azobenzene-graphene metal coordination solar photothermal energy storage material: dispersing a certain amount of azobenzene-graphene material in DMF ultrasonically, and dissolving a metal compound in DMF ultrasonically with the molar ratio of the metal compound used for coordination to azobenzene-graphene being (0.1-20):1, and then adding the DMF solution of the metal compound into the DMF solution of the azobenzene-graphene and standing for 4-24 h, taking out the precipitate, washing off the meal ions which do not participate in coordination using ethanol, and drying the obtained product in an oven at 60° C. to obtain the azobenzene-graphene metal coordination solar photothermal energy storage material.

Example 1

(1) Preparing a reduced graphene oxide: The concentration of the aqueous solution of the graphene oxide (GO) prepared by Hummers method was adjusted to 1 mg/mL, and a hydrothermal reaction was performed at 80° C. for 12 h, to obtain an aqueous solution of the reduced graphene oxide (RGO).

(2) Preparing a sulphonic acid azobenzene-graphene material: 1.109 g of 4'-aminoazobenzene-4-sulphonic acid and 0.304 g of $NaNO_2$ were dissolved into 20 mL of 1 mol/L HCl aqueous solution at room temperature, respectively. The hydrochloric acid solution of $NaNO_2$ was added dropwise into the hydrochloric acid solution of 4'-aminoazobenzene-4-sulphonic acid at 0-5° C., to form a diazonium salt. The diazonium salt was added into 100 mL of 1 mg/mL the reduced graphene oxide solution obtained in step (1) to react for 24 h. The obtained product was washed with water, N,N-dimethylformamide (DMF) and ethanol until no characteristic absorption peak of azo appears in the UV absorption detection of the filtrate. Then the obtained product was dried in an oven at 60° C. to obtain the sulphonic acid azobenzene-graphene material.

(3) Preparing a sulphonic acid azobenzene-graphene magnesium (Mg) metal coordination solar photothermal energy storage material: 2.08 g of the sulphonic acid azobenzene-graphene material was dispersed in DMF ultrasonically. 3.81 g of $MgCl_2$ was dissolved in DMF ultrasonically. Then the DMF solution of $MgCl_2$ was added into the DMF solution of the sulphonic acid azobenzene-graphene and the mixture was stood for 12 h. The precipitate was taken out, and the meal ions which did not participate in coordination were washed using ethanol. The obtained product was dried in an oven at 60° C. to obtain the sulphonic acid azobenzene-graphene magnesium metal coordination solar photothermal energy storage material.

The obtained sulphonic acid azobenzene-graphene magnesium metal coordination solar photothermal energy storage material was represented by the following structural formula:

Example 2

(1) Preparing a reduced graphene oxide: The concentration of the aqueous solution of the graphene oxide (GO) prepared by Hummers method was adjusted to 1 mg/mL, and a hydrothermal reaction was performed at 80° C. for 12 h, to obtain an aqueous solution of the reduced graphene oxide (RGO).

(2) Preparing a sulphonic acid azobenzene-graphene material: 1.109 g of 4'-aminoazobenzene-4-sulphonic acid and 0.304 g of NaNO$_2$ were dissolved into 20 mL of 1 mol/L HCl aqueous solution at room temperature, respectively. The hydrochloric acid solution of NaNO$_2$ was added dropwise into the hydrochloric acid solution of 4'-aminoazobenzene-4-sulphonic acid at 0-5° C., to form a diazonium salt. The diazonium salt was added into 100 mL of 1 mg/mL the reduced graphene oxide solution obtained in step (1) to react for 24 h. The obtained product was washed with water, N,N-dimethylformamide (DMF) and ethanol until no characteristic absorption peak of azo appears in the UV absorption detection of the filtrate. Then the obtained product was dried in an oven at 60° C. to obtain the sulphonic acid azobenzene-graphene material.

(3) Preparing a sulphonic acid azobenzene-graphene iron (Fe) metal coordination solar photothermal energy storage material: 2.08 g of sulphonic acid azobenzene-graphene material was dispersed in DMF ultrasonically. 6.48 g of FeCl$_3$ was dissolved in DMF ultrasonically. Then the DMF solution of FeCl$_3$ was added into the DMF solution of the sulphonic acid azobenzene-graphene material and the mixture was stood for 12 h. The precipitate was taken out, and the meal ions which did not participate in coordination were washed using ethanol. The obtained product was dried in an oven at 60° C. to obtain the sulphonic acid azobenzene-graphene iron metal coordination solar photothermal energy storage material.

The obtained sulphonic acid azobenzene-graphene iron metal coordination solar photothermal energy storage material was represented by the following structural formula:

Example 3

(1) Preparing a reduced graphene oxide: The concentration of the aqueous solution of the graphene oxide (GO) prepared by Hummers method was adjusted to 1 mg/mL, and a hydrothermal reaction was performed at 80° C. for 12 h, to obtain an aqueous solution of the reduced graphene oxide (RGO).

(2) Preparing a sulphonic acid azobenzene-graphene material: 1.109 g of 4'-aminoazobenzene-4-sulphonic acid and 0.304 g of NaNO$_2$ were dissolved into 20 mL of 1 mol/L HCl aqueous solution at room temperature, respectively. The hydrochloric acid solution of NaNO$_2$ was added dropwise into the hydrochloric acid solution of 4'-aminoazobenzene-4-sulphonic acid at 0-5° C., to form a diazonium salt. The diazonium salt was added into 100 mL of 1 mg/mL the reduced graphene oxide solution obtained in step (1) to react for 24 h. The obtained product was washed with water, N,N-dimethylformamide (DMF) and ethanol until no characteristic absorption peak of azo appears in the UV absorption detection of the filtrate. Then the obtained product was dried in an oven at 60° C. to obtain the sulphonic acid azobenzene-graphene material.

(3) Preparing a sulphonic acid azobenzene-graphene nickel (Ni) metal coordination solar photothermal energy storage material: 2.08 g of sulphonic acid azobenzene-graphene material was dispersed in DMF ultrasonically. 5.18 g of NiCl$_2$ was dissolved in DMF ultrasonically. Then the DMF solution of NiCl$_2$ was added into the DMF solution of the sulphonic acid azobenzene-graphene material and the mixture was stood for 12 h. The precipitate was taken out, and the meal ions which did not participate in coordination were washed using ethanol. The obtained product was dried in an oven at 60° C. to obtain the sulphonic acid azobenzene-graphene nickel metal coordination solar photothermal energy storage material.

Figure 1:
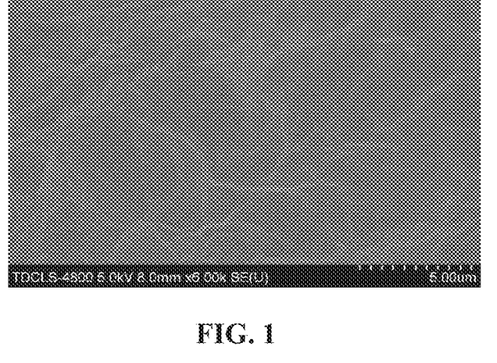
FIG. 1 is a scanning electron microscope (SEM) image of the azobenzene-graphene material of the present disclosure.
Figure 2:
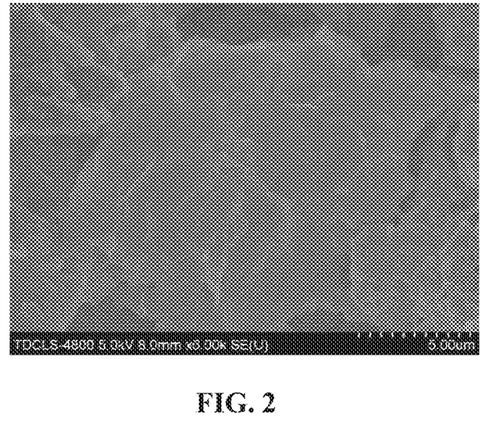
FIG. 2 is a scanning electron microscope (SEM) image of the azobenzene-graphene metal coordination solar photothermal energy storage material of the present disclosure.
Figure 3:
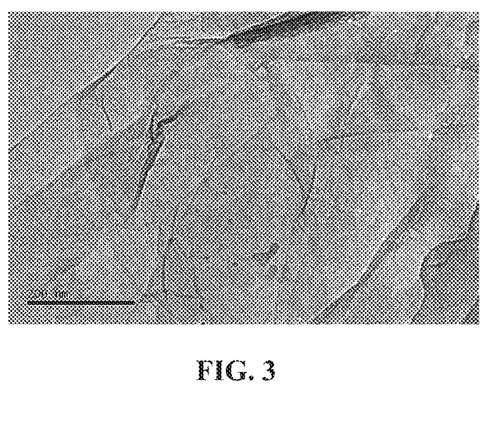
FIG. 3 is a transmission electron microscope (TEM) image of the azobenzene-graphene material of the present disclosure.
Figure 4:
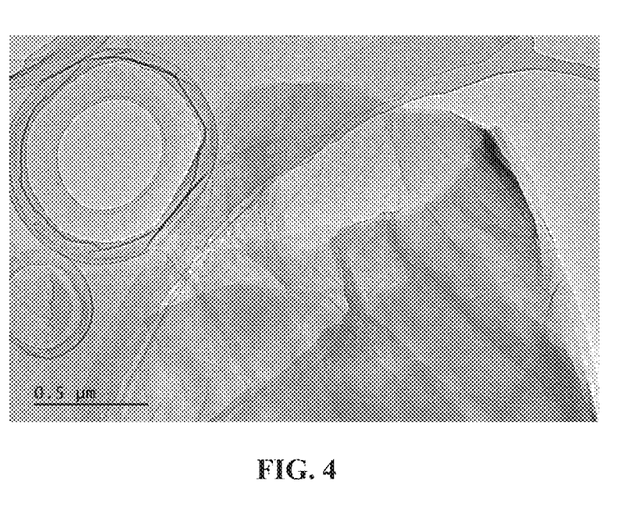
FIG. 4 is a transmission electron microscope (TEM) image of the azobenzene-graphene metal coordination solar photothermal energy storage material of the present disclosure.
Figure 5:
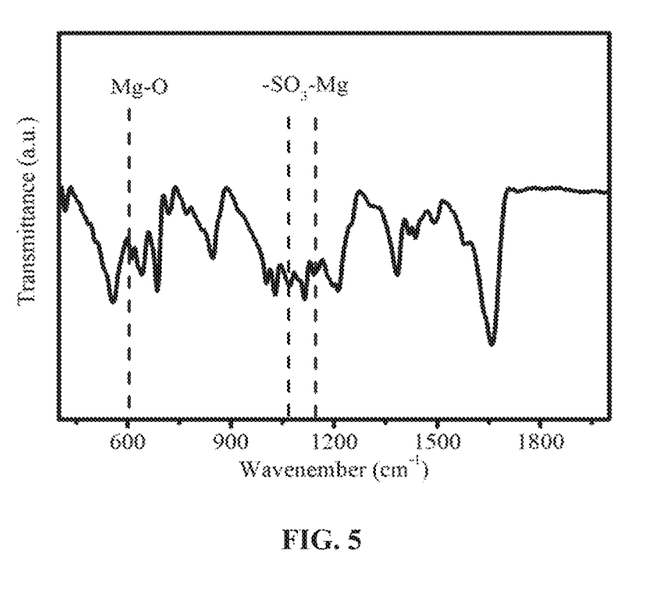
FIG. 5 is the FT-IR spectra of the sulphonic acid azobenzene-graphene magnesium metal coordination solar photothermal energy storage material of the present disclosure.
Figure 6:
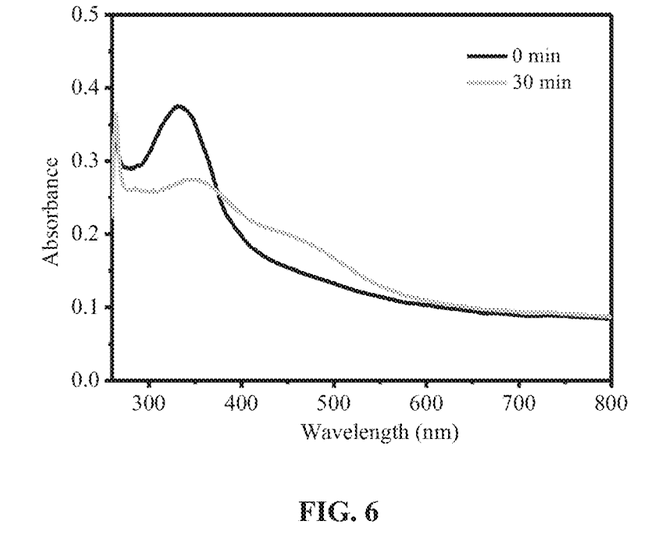
FIG. 6 is the UV-Vis absorption spectra of the sulphonic acid azobenzene-graphene magnesium metal coordination solar photothermal energy storage material dispersed in DMF, showing the comparison of isomerization degree before UV-irradiated (0 min) and after UV-irradiated 30 min. It can be seen from the figure that the trans-enriched state is transformed into the cis-enriched state after ultraviolet irradiation, and solar energy is stored.
Figure 7:
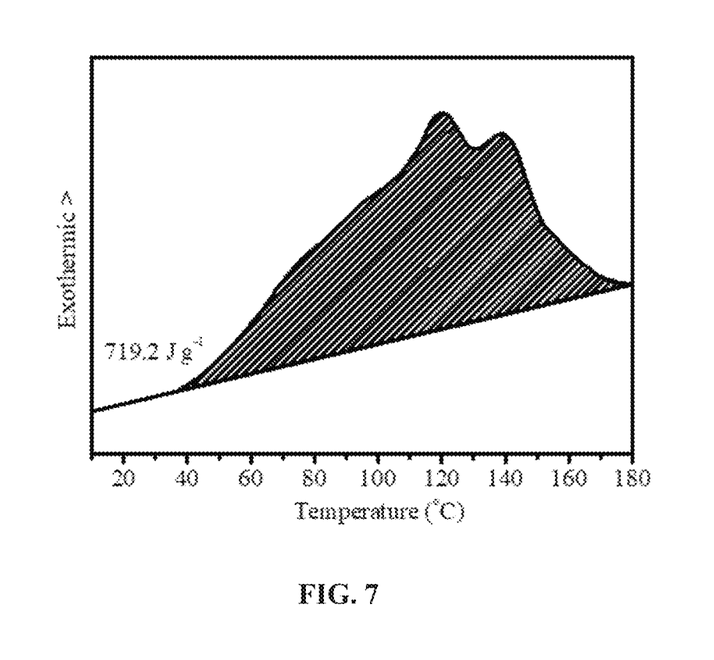
FIG. 7 is a differential scanning calorimetry analysis (DSC) exotherm diagram of the sulphonic acid azobenzene-graphene magnesium metal coordination solar photothermal energy storage material of the present disclosure.
Figure 8:
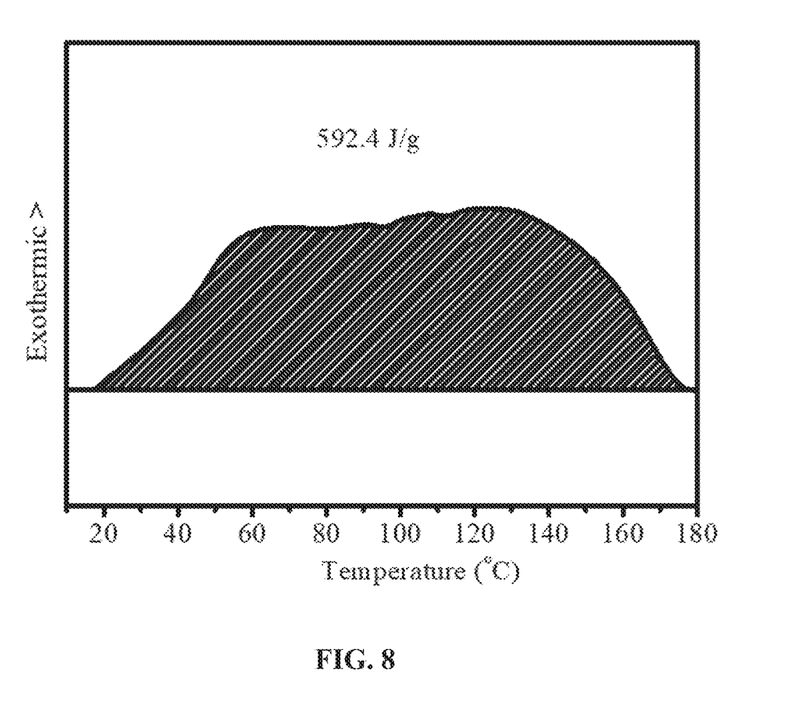
FIG. 8 is a DSC exotherm diagram of the sulphonic acid azobenzene-graphene iron metal coordination solar photothermal energy storage material of the present disclosure.

The obtained sulphonic acid azobenzene-graphene nickel metal coordination solar photothermal energy storage material was represented by the following structural formula:

As can be seen from FIGS. 1 and 2, the morphology of the azobenzene-graphene metal coordination solar photothermal energy storage material aggregates after coordinated with metal. This is because the azobenzene-graphene is connected together by the metal coordination bonds. As also can be seen from FIGS. 3 and 4, the morphology of the azobenzene-graphene metal coordination solar photothermal energy storage material aggregates after coordinated with metal, and it is preliminarily proved that the azobenzene-graphene metal coordination solar photothermal energy storage material is obtained. After the FT-IR spectra test was performed, as shown in FIG. 5, the absorption peak of the metal coordination bond appears in the FT-IR spectra of the sulphonic acid azobenzene-graphene magnesium metal coordination solar photothermal energy storage material, which once again proves that the azobenzene-graphene metal coordination solar photothermal energy storage material is obtained. FIG. 6 shows the UV-Vis absorption spectra of sulphonic acid azobenzene-graphene magnesium metal coordination solar photothermal energy storage material. The isomerization occurs before UV-irradiated (0 min) and after UV-irradiated 30 min. It can be seen from the figure that the trans-enriched state is transformed into the cis-enriched state after ultraviolet irradiation, and solar energy is stored. FIG. 7 shows that the sulphonic acid azobenzene-graphene magnesium metal coordination solar photothermal energy storage material has a heat storage density of up to 719.2 J/g. FIG. 8 shows that the sulphonic acid azobenzene-graphene iron metal coordination solar photothermal energy storage material has a heat storage density of up to 592.4 J/g. The azobenzene-graphene metal coordination solar photothermal energy storage material exhibits excellent heat storage performance.

Adjusting the functional groups, coordination metals, process parameters and so on according to the present disclosure can all realize the preparation of an azobenzene-graphene metal coordination solar photothermal energy storage material, which exhibits a performance basically consistent with the present invention in the test. That is, through the DSC test, the obtained azobenzene-graphene metal coordination solar photothermal energy storage material has a heat storage density of 400-750 J/g. The present invention has been exemplarily described above.

The azobenzene-graphene metal coordination solar photothermal energy storage material obtained in the present disclosure has an excellent heat storage density and a long heat storage time, and can be applied in the field of solar photothermal energy storage.

An azobenzene-graphene metal coordination solar photothermal energy storage material and a preparation method thereof are disclosed and provided in the present disclosure. Those skilled in the art can achieve it by learning from the content of this context and appropriately changing the conditions or routes and the like. Although the method and preparation technology of the present disclosure have been described through preferred embodiments, those skilled in the art can obviously modifying and recombining the methods and technical routes described herein without departing from the content, spirit and scope of the present disclosure to achieve the final preparation technique.

What is claimed is:

1. An azobenzene-graphene metal coordination solar photothermal energy storage material represented by the following chemical formula:

-continued wherein M=Mg, Ni, Zn, Cu or Ca; and
X=Fe or Al.

2. A method for preparing the azobenzene-graphene metal coordination solar photothermal energy storage material of claim 1, the method comprising the following steps:
(1) preparing reduced graphene oxide: hydrothermally reacting an aqueous solution of graphene oxide (GO) prepared using Hummers method to obtain an aqueous solution of reduced graphene oxide (RGO);
(2) preparing an azobenzene-graphene material: preparing a hydrochloric acid solution of 4'-aminoazobenzene-4-sulphonic acid and a hydrochloric acid solution of NaNO2 respectively, adding the hydrochloric acid solution of NaNO2 dropwise into the hydrochloric acid solution of 4'-aminoazobenzene-4-sulphonic acid at 0-5° C. to form a diazonium salt; adding the diazonium salt into the aqueous solution of the reduced graphene oxide obtained in step (1) to react for a period of time; and washing the obtained product with water, NN-dimethylformamide (DMF) and ethanol until no characteristic absorption peak of azo appears in the UV absorption detection of the filtrate; and drying to obtain an azobenzene-graphene material; and
(3) preparing an azobenzene-graphene metal coordination solar photothermal energy storage material: dispersing the azobenzene-graphene material prepared in step (2) in DMF and dissolving an amount of a metal compound in DMF, adding the DMF solution of the metal compound into the DMF solution of the azobenzene-graphene, taking out the precipitate, washing off metal ions which do not participate in coordination, and drying the obtained product to obtain an azobenzene-graphene metal coordination solar photothermal energy storage material.

3. The method according to claim 2, wherein in step (1), the aqueous solution of graphene oxide (GO) is hydrothermally reacted at 60° C.-160° C. for 2-48 h.

4. The method according to claim 2, wherein in step (3), the metal compound used for coordination is $MgCl_2$, $NiCl_2$, $ZnCl_2$, $CuCl_2$, $CaCl_2$, $FeCl_3$, or $AlCl_3$; and, the coordination central ion in the azobenzene-graphene metal coordination solar photothermal energy storage material is a magnesium ion, a nickel ion, a zinc ion, a copper ion, a calcium ion, an iron ion, or an aluminum ion.

5. The method according to claim 2, wherein in step (3), the molar ratio of the metal compound used for coordination to azobenzene-graphene is (0.1-20):1.

6. A molecular solar energy fuel, comprising the azobenzene-graphene metal coordination solar photothermal energy storage material according to claim 1.

* * * * *